United States Patent [19]

St. Germain

[11] 4,241,575
[45] Dec. 30, 1980

[54] CHAIN SADDLE ASSEMBLY

[75] Inventor: Dennis St. Germain, Wilmington, Del.

[73] Assignee: I & I Sling Company, Inc., Aston, Pa.

[21] Appl. No.: 939,349

[22] Filed: Sep. 5, 1978

[51] Int. Cl.³ .............................................. B66C 1/12
[52] U.S. Cl. .................................... 59/93; 24/116 R; 294/78 A
[58] Field of Search .............................. 59/93, 78, 86; 24/116 R; 294/78 R, 78 A, 74, 82 R

[56] References Cited

U.S. PATENT DOCUMENTS

| | | | |
|---|---|---|---|
| 569,448 | 10/1896 | Dudley | 24/116 R |
| 1,326,969 | 1/1920 | Rounds | 294/78 A |
| 2,820,661 | 1/1958 | Koons | 294/78 |
| 3,027,615 | 4/1962 | Forney | 24/116 R |
| 3,611,710 | 10/1971 | Holmes | 24/116 R |
| 4,060,269 | 11/1977 | Rieger | 294/78 A |

FOREIGN PATENT DOCUMENTS 1135182 12/1968 United Kingdom ................. 294/74

*Primary Examiner*—Francis S. Husar
*Assistant Examiner*—Gene P. Crosby
*Attorney, Agent, or Firm*—Anthony J. McNulty

[57] ABSTRACT

A chain saddle assembly is disclosed which permits a chain used as a sling to be supported at any point between its opposite ends. The supported link is placed in a groove so that the link is lying sideways with one leg of the link above the other. Ledges are provided which engage the two links of the chain adajacent to the link which is being supported. The assembly thus prevents possible slipage of the chain through the assembly while providing proper support without imposing undo stress concentrations on the supported link or the links adjacent to it.

2 Claims, 4 Drawing Figures

CHAIN SADDLE ASSEMBLY

BACKGROUND OF THE INVENTION

This invention relates to a device for adjusting chain length to accomodate different lifting points of chains used either as tie downs or more particularly as chain slings for lifting and moving heavy industrial equipment and materials.

There are many applications in industry where it is necessary to lift and/or transport heavy industrial materials such as machinery, automobiles or coils of rolled steel. To do this, many rigging crews will employ link chains for the slings and tie down systems which are needed. However, the expense and weight of chain based devices are such that most rigging crews will carry only a few, relatively long chains, to meet their needs. On most occasions, however, it is seldom that they will have a chain that is precisely the right length for the application at hand. In most cases the chain will be too long and it is necessary to adjust the chain length to meet the particular needs without compromising either its ability to meet that need or its utility for other applications where the full length of the chain might be necessary. Many times this adjustment is accomplished by the use of a grab link of some type. In other applications the chain is passed either around or through a loop or shackle attached to the particular item being transported with the free end then being clamped with a grab hook or similar device to one or more of the links along the working length of the sling. In still other cases, various devices have been developed which allow shortening of the chain in the middle thereof leaving both ends free to be attached to a support such as the hook of a crane on one end and to the object being lifted on the other. However, one problem with many of these devices is their complexity and attendant high cost which results from the many welds and the relatively large amount of labor required for their manufacture.

A second problem is often encountered when the chain either has no end pieces or has end pieces of the wrong type - such as a grab hook when a master ring is needed for crane attachment. In such cases it is often necessary to rig up some sort of connection device and attach it, in some way or other to the chain so it can be used.

In practically all of these cases, however, it has been found that such techniques eventually cause severe deterioration of the ability of the chain to handle its full load capability. This may occur, on one hand, by cracking of the chain links due to localized high stresses induced by the method of clamping, or by overstraining the particular links causing them to become brittle through work hardening. In still other cases they induce severe bending movements which act to twist, distort or stretch the links beyond their yield point thus causing failure. A technique or device is required which will allow an adjustment of the length of a chain to meet varying industrial applications without affecting its ability to handle loads when fully extended and without shortening its expected service life.

DESCRIPTION OF THE PRIOR ART

There have been many attempts to solve the foregoing problems. For example, there are a number of commercially available sling assemblies incorporating auxilliary grab hooks which allow a considerable degree of sling adjustment with a minimum of effort, but subject, however, to the basic problems noted above. In addition, Sylvester in U.S. Pat. No. 1,303,521, Forney in U.S. Pat. No. 3,027,615, and Holmes in U.S. Pat. No. 3,611,710 all disclose special fixtures which are designed in one way or another to accomplish an adjustment of the length of slings or tie down chains. It has been found that in each case such prior art methods for adjusting chain length act to impose potentially deteriorating bending moments and enhance tensile stress on one or more of the links at the point or points where the chain physically contacts the device as compared to the chain as a whole.

BRIEF SUMMARY OF THE INVENTION

The preferred embodiment of the invention comprises a vertical ring referred to herein as a chain saddle assembly. The ring is of such a diameter so as to easily accomodate either the hook or one of the normal attachment fixtures, such as a latched sling hook or a grab hook, found on the ends of chains used in most rigging operations. Located within and integral with the bottom portion of the ring is a chain saddle block having a slot or groove therein which is used to accomplish the stress free adjustment and clamping of the chain. Adjustment is simply performed merely by sliding the chain through the assembly until the proper length is reached and dropping a link of the chain, sideways into the slot. There is no requirement that both ends of the chain be of equal length so easy adjustment to pick up uneven or unbalanced loads is possible. The slot is of sufficient width to allow easy insertion and removal of a link in an unloaded chain and has a rounded bottom to support it but is not so wide as to permit much lateral movement.

Initial clamping of the unloaded chain is accomplished by the slot since horizontally laid out links cannot be pulled through it. This clamping action is augmented by a pair of longitudinal outriggers or ledges, one on either side of the slot. These ledges are placed such that the top surfaces thereof act as extensions of the rounded bottom of the slot. The ledges are of sufficient size that the full length of the supported chain link in the slot is supported when properly positioned.

Anchoring of the chain under load is also performed by the ledges. This is accomplished by first setting the supported link of the chain in the slot so that the adjacent links of the chain can fit freely over the ledges. Thus, under load the adjacent links will be pulled essentially straight down with respect to the supported link which acts to fix the supported link in place. Final anchoring is accomplished by further adapting the ledges so that they will fit into the center of the two adjacent links so that, under load, they are rigidly clamped in place and their freedom of motion is effectively restricted. By so doing the entire chain is effectively fixed onto the saddle block and cannot slip. Furthermore, overall job safety is increased since the method of link support allows the whole block and crane hook to pick up the load without placing undue strains or bending moments on the support link and its adjacent links. Additionally, when a grab hook is used it too will tend to be underloaded so that the grabbed links along the length of the chain will also not be overstressed thus providing further improvement in chain life.

One chain saddle assembly of the present invention can be used for a multiplicity of different chains, provided they all use links of the same diameter.

The effectiveness of this approach was illustrated in a series of yield and chain life tests. Typically, in double leg tests the chain will fail in a link of the legs and not in one of the links either supported in the saddle block groove or clamped by the ledges. In such situations the load is still supported by one leg of the chain so that chances of recovering it undamaged or preventing injury to the riggers are substantially improved over normal rigging practices. In single leg tests, the link in the saddle block will break but this is identical to the failure mode in a single leg test for a conventional grab hook locked assembly.

These advantages are not obtained at the cost of overall economy. In a cost analysis based on comparative overall lifting capabilities for a general purpose rigging operation, it was found that chain costs could be reduced by as much as half of those normally encountered, when chains were used in conjunction with the chain saddle assembly of the present invention. This resulted from the fact that fewer chains were required and those that were, lasted longer in service. The cost of the chain saddle assemblies was a relatively minor part of the total cost, as fewer assemblies were required as compared with other devices and due to the fact that the unit cost of the chain saddle assembly is lower due to less welding, labor and other manufacturing costs.

It is therefore the primary object of this invention to provide a device for easily adjusting the effective length of chains used for slings.

It is further object of this invention to provide a device which will allow the use of chains for slings without distorting or overstressing the load bearing links of the chain.

It is still a further object of this invention to provide a low cost device which will allow the adjustment of single chains so they can be used to lift unbalanced or unevenly distributed loads or to lift loads having different heights at their lifting points.

It is another object to provide a device which will positively clamp and anchor a chain used as a sling so that it cannot slip while under load.

The invention will be better understood, and additional objects will become apparent from the following description viewed in conjunction with the accompanying drawings which illustrate the use and preferred embodiment of the invention.

DESCRIPTION OF THE PREFERRED EMBODIMENT

Figure 1:
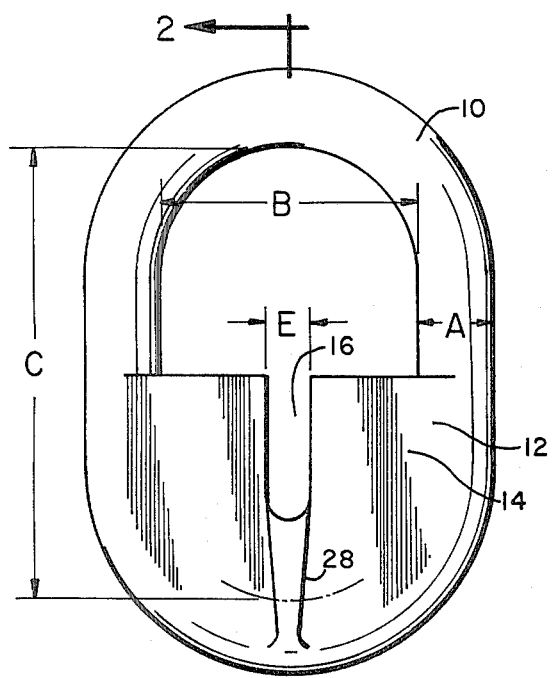
FIG. 1 is a front elevation view of a chain saddle assembly.
Figure 2:
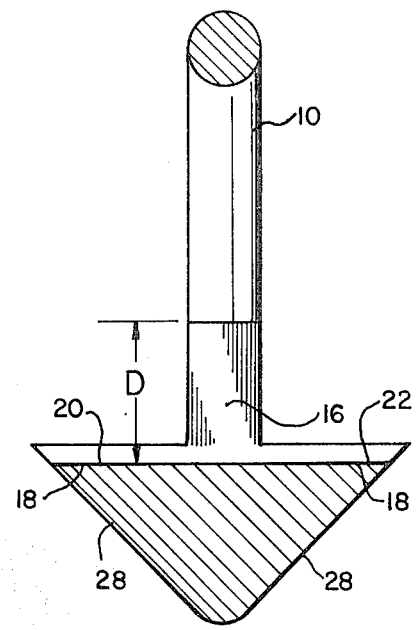
FIG. 2 is a cut away side view of the assembly taken along line 2—2 in FIG. 1.
Figure 3:
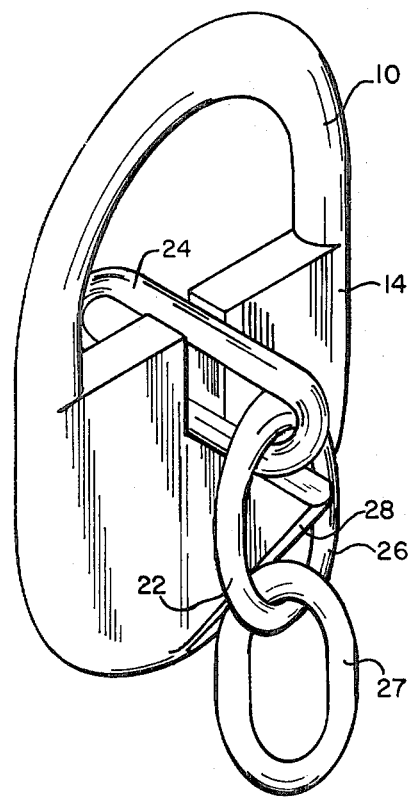
FIG. 3 is a front elevation view of the assembly in use showing it associated with a chain.

Referring now to FIGS. 1, 2, and 3 the preferred embodiment of the chain saddle assembly 8 of the present invention is shown. The assembly includes a ring link 10 which is basically similar in size, shape and capacity to a conventional oblong master link and having dimensions A, B and C. Thus, for example, if designed for a standard 1 inch double chain sling, the link thickness A would be approximately 2 inches, the inside width B approximately 7 inches and the inside length C approximately 12 inches. The working load limit would be within the range of 40,000 to 60,000 pounds.

Positioned at the mid point of the vertical height of ring 10 and integral with the inside perimeter of the lower half of the ring is saddle block 12. The saddle block 12 includes a saddle plate 14 having a thickness approximately equal to the thickness A of ring 10. The saddle plate 14 has a vertical saddle groove or channel 16. This groove has a depth D which is slightly less than the width of the chain link to be accomodated. For a standard 1 inch chain this would be approximately 4 inches. Similarly the width E of groove 16 will also be related to the size of the links used in a particular chain but here width E will be justly slightly wider and essentially vertical to allow the link to be easily slipped in and out of groove 16 without allowing it to tilt unduly to either side when at rest. Thus for a 1 inch chain the width will be approximately 1150 inches. Lastly the bottom of groove 16 is concave to provide proper support for the cradled link. To accomplish this the radius of curvature of the bottom is slightly larger than that of the link.

Extending outward from both ends of the bottom of the groove 16 are a pair of lateral ledges 18. These can be of any shape such as semicircular or rectangular, but in the preferred embodiment are essentially right triangles. As shown in FIG. 1 the upper surfaces 20 of the ledges are also concave to provide additional support for the entire length of the supported link.

The use of the assembly and the specific purpose of the ledges is shown more particularly in FIG. 3. A chain 22 is shown in the assembly of the present invention. Resting in a horizontal, edgewise position in groove 16 is a link 24 of the chain. As shown it is fully supported by the rounded bottom of groove 16 and the concave indentations in ledges 18 so that the load on link 24 is effectively transferred into the saddle plate 14 of the saddle assembly 12 and through it to the crane hook or other attachment device (not shown) which is connected to ring 10. Locking of the chain 22 into assembly 12 is accomplished by adjacent links 26 cooperating with ledges 18. As shown, each ledge 18 fits snugly into the center of the adjacent links 26 to hold them in a fixed but not locked position. Under load links 26 are pulled down and locked in place by the upper outer surfaces of links 27 which pull in and bear up against the angled surface 28 of the triangular ledges 18. This assures the smooth transfer of the load to links 24 without exerting undo bending moments or excessive localized stresses on them. This smooth transfer and lack of excessive stress is responsible for the enhanced capability by the chain saddle assembly of the present invention As an example of how well this is achieved, in a double leg tensile test with an assembly designed and used with a standard ⅜ inch two chain sling (i.e. a sling with conventional hooks on both ends of the chain hanging from the saddle assembly) having a nominal working load limit of 13,000 pounds, failed at approximately 66,000 pounds. Subsequent examination showed that the failure was in a link of the chain 22 which was not in contact with the chain saddle assembly 8 and not in the ring 10, which was found to be undamaged.

It should be noted that one important use of this assembly will be to shorten overly long chains to form single leg slings. In normal applications, the hook in the free end must be rigidly clamped somewhere along the length of chain to form a loop which allows the sling to be picked up. As discussed herein above such a practice can cause severe damage to the chain at both the pickup and gripped points. With this device the chain is effectively clamped at the pickup point so there is no need for the free end to be rigidly clamped rather, more as a safety measure than as an operational necessity, the hook on the free end need only be loosely clamped to the chain to prevent it from swinging freely as the load is being moved.

Figure 4:
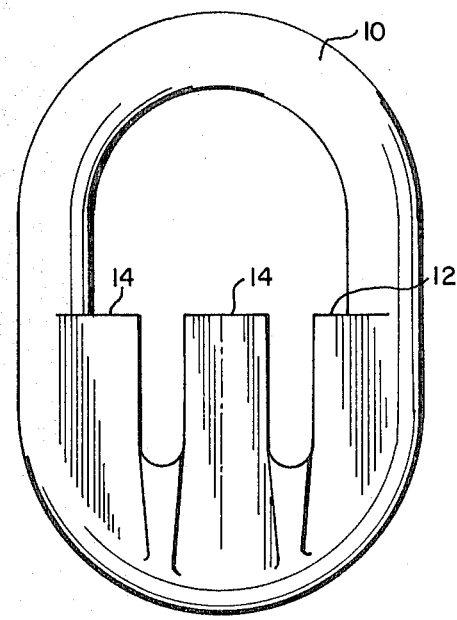
FIG. 4 shows a front elevation view of a second embodiment of the invention which incorporates two chain saddle assemblies.

In addition to the preferred single chain saddle embodiment described above, multiple chain saddle assemblies are also possible. Such an assembly showing two chain saddles on a single ring is shown in FIG. 4. Each of the individual saddles is essentially identical to the single unit described above. Because of the greater load carrying capacity of multisaddle assemblies, however, ring 10 should be made sturdier. Thus, for 1 inch chain dual saddle assembly the equivalent master link should have a maximum load capability of approximately 100,000 pounds.

While the invention has been illustrated and disclosed with reference to a preferred embodiment, it is to be understood that various changes and modifications may be made to the invention without departing from the spirit thereof.

What is claimed is:

1. A chain saddle assembly for adjusting chain lengths and attaching chains used in chain slings comprising:

a ring link used to attach the assembly to a crane hook;

a saddle block, said block being integral with the bottom of said ring link so that a chain may easily be passed therethrough, said block further having a groove therein, said groove having a sufficient width and depth to receive a sideways vertically standing link of the chain and further having a rounded bottom adapted to support the link so that excessive bending moments or tensile stresses are not introduced into the link when it is loaded, while preventing the chain from slipping.

a pair of lateral, right triangular ledges, attached respectively to the opposite sides of said saddle block, the upper surfaces of which are concave indented and adapted to act as extensions of the bottom of said groove to provide additional support for the ends of the supported link said ledges being shaped to receive, and when the chain is loaded, to clamp, a pair of links lying in adjoining sucession adjacent to the supported link in a vertical orientation against an end portion of one of said ledges whereby bending moments in the supported link are prevented and the front and rear ends of the chain are locked in place.

2. The invention of claim 1 wherein said ledges are adapted to permit a chain having a hook on one end to form a single leg sling whereby the chain is anchored at some point along its length while the hook is attached to the load.

* * * * *